US007639243B2

(12) United States Patent
Lee et al.

(10) Patent No.: US 7,639,243 B2
(45) Date of Patent: Dec. 29, 2009

(54) ASYMMETRIC DISPLAY PANEL AND IMAGE INVERSION METHOD THEREOF

(75) Inventors: Meng-Ju Lee, Tai-Nan (TW); Chi-Mao Hung, Chiayi (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 549 days.

(21) Appl. No.: 11/425,127

(22) Filed: Jun. 19, 2006

(65) Prior Publication Data

US 2007/0205998 A1 Sep. 6, 2007

(30) Foreign Application Priority Data

Mar. 1, 2006 (TW) .............................. 95106871 A
Apr. 7, 2006 (TW) .............................. 95112413 A

(51) Int. Cl.
*G06F 3/38* (2006.01)
*G09G 5/00* (2006.01)

(52) U.S. Cl. .......................... 345/204; 345/212; 345/98

(58) Field of Classification Search ................. 345/204
See application file for complete search history.

(56) References Cited

U.S. PATENT DOCUMENTS

| | | | | |
|---|---|---|---|---|
| 7,525,530 | B2 * | 4/2009 | Takafuji et al. | 345/98 |
| 2003/0193574 | A1 * | 10/2003 | Tanimoto | 348/207.99 |
| 2007/0109286 | A1 * | 5/2007 | Nakamura et al. | 345/204 |
| 2007/0279406 | A1 * | 12/2007 | Ishiyama | 345/212 |

* cited by examiner

*Primary Examiner*—Alexander Eisen
*Assistant Examiner*—Charles Hicks
(74) *Attorney, Agent, or Firm*—Winston Hsu

(57) ABSTRACT

An asymmetric display panel has driver integrated circuits. When the asymmetric display panel is in an image inversion state, a boosting clock signal is transmitted to drive the data lines or the scan lines that are disconnected from the asymmetric display panel. A pulse number of the boosting clock signal is equal to a number of the data lines or scan lines that are disconnected from the asymmetric display panel.

7 Claims, 8 Drawing Sheets

ASYMMETRIC DISPLAY PANEL AND IMAGE INVERSION METHOD THEREOF

BACKGROUND OF THE INVENTION

1. Field of the Invention

The present invention relates to a method for image inversion, and more particularly, to a method for image inversion on an asymmetric display panel.

2. Description of the Prior Art

A display panel usually comprises a plurality of gate driver integrated circuits. If a gate driver integrated circuit is capable driving 250 gate lines, three gate driver integrated circuits are needed to drive a display panel with 800×600 resolution, i.e., the display panel has 600 gate lines. In this case, all gate lines of two of the three gate driver integrated circuits are coupled to a display area of the display panel, and some gate lines of the other gate driver integrated circuit are not coupled to the display area of the display panel. Therefore, the display panel is classified as an asymmetric display panel.

SUMMARY OF THE INVENTION

The present invention provides an image inversion method for uses in a display panel. The method comprises: providing a frame-inversion request signal; providing a boosting clock signal in response to the frame-inversion request signal; driving a plurality of gate lines disconnected from a display area on the display panel in response to the boosting clock signal; providing a gate clock signal; and driving a plurality of gate lines coupled to the display area in response to the gate clock signal. The boosting clock signal is provided during a blanking period of a frame display period, and the gate clock signal is provided in a display period of the frame display period.

The present invention also discloses an asymmetric display panel. The asymmetric display panel comprises a substrate, a plurality of gate lines, a plurality of data lines, a clock generator, a microcontroller, a multiplexer, at least one data line driving circuit, and at least one gate line driving circuit. The substrate has a display area. The plurality of gate lines and the plurality of data lines are formed on the substrate. The clock generator is positioned on the substrate and is used to generate a gate clock signal and a data clock signal. The microcontroller is positioned on the substrate and coupled to the clock generator to generate a boosting clock signal and a selection signal. The multiplexer is positioned on the substrate and includes a first input, a second input, an output, and a controlling input. The first input of the multiplexer is coupled to the clock generator. The second input of the multiplexer is coupled to the microcontroller to receive the boosting clock signal from the microcontroller. The controlling input of the multiplexer is coupled to the microcontroller to receive the selection signal from the microcontroller. Therefore, the multiplexer outputs at least one of the gate clock signal and the boosting clock signal in response to the selection signal. The data line driving circuit is electrically coupled to the data lines. The gate line driving circuit comprises a first output, a second output, and an input. The first output of the gate line driving circuit is coupled to the gate lines that are disconnected from the display area. The second output of the gate line driving circuit is coupled to gate lines that are coupled to the display area. The input of the gate line driving circuit is coupled to the output of the multiplexer to receive at least one of the gate clock signal and the boosting clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
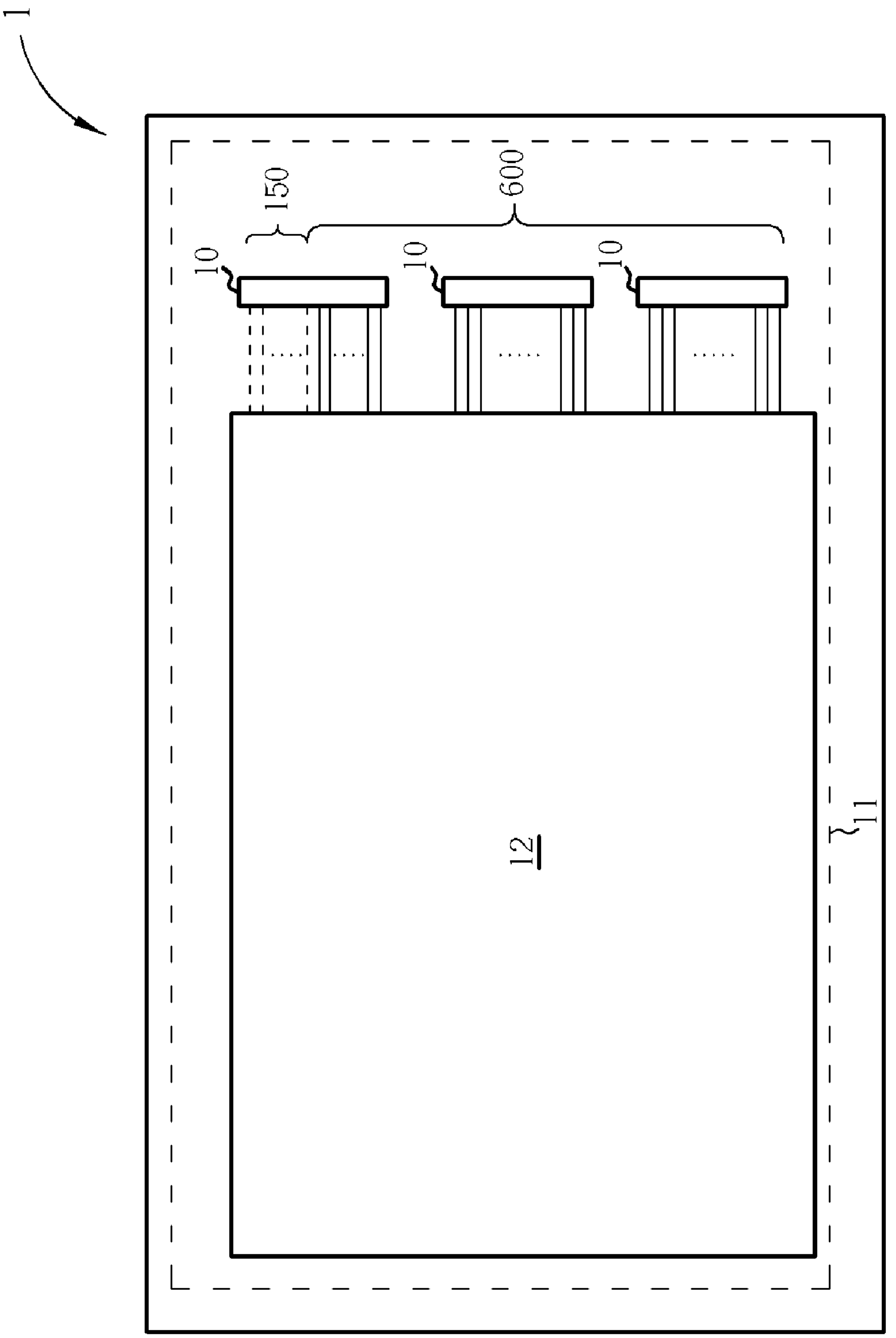
FIG. 1 is a schematic diagram of an asymmetric display panel according to the present invention.

Please refer to FIG. 1, which is a schematic diagram of an asymmetric display panel 1 according to the present invention. The asymmetric display panel 1 comprises a plurality of gate driver integrated circuits 10, a.k.a., scan line driver integrated circuits, and a display area 12. The gate driver integrated circuits 10 and the display area 12 are positioned on a substrate. Suppose that the number of gate lines, a.k.a., scan lines, of the asymmetric display panel 1 is 600, and that a gate driver integrated circuit 10 is capable of driving 250 gate lines. There are two gate driver integrated circuits that each have 250 gate lines all coupled to the display area 12, and another gate driver integrated circuit that has 100 gate lines coupled to the display area 12 and 150 gate lines disconnected from the display area 12.

Figure 2:
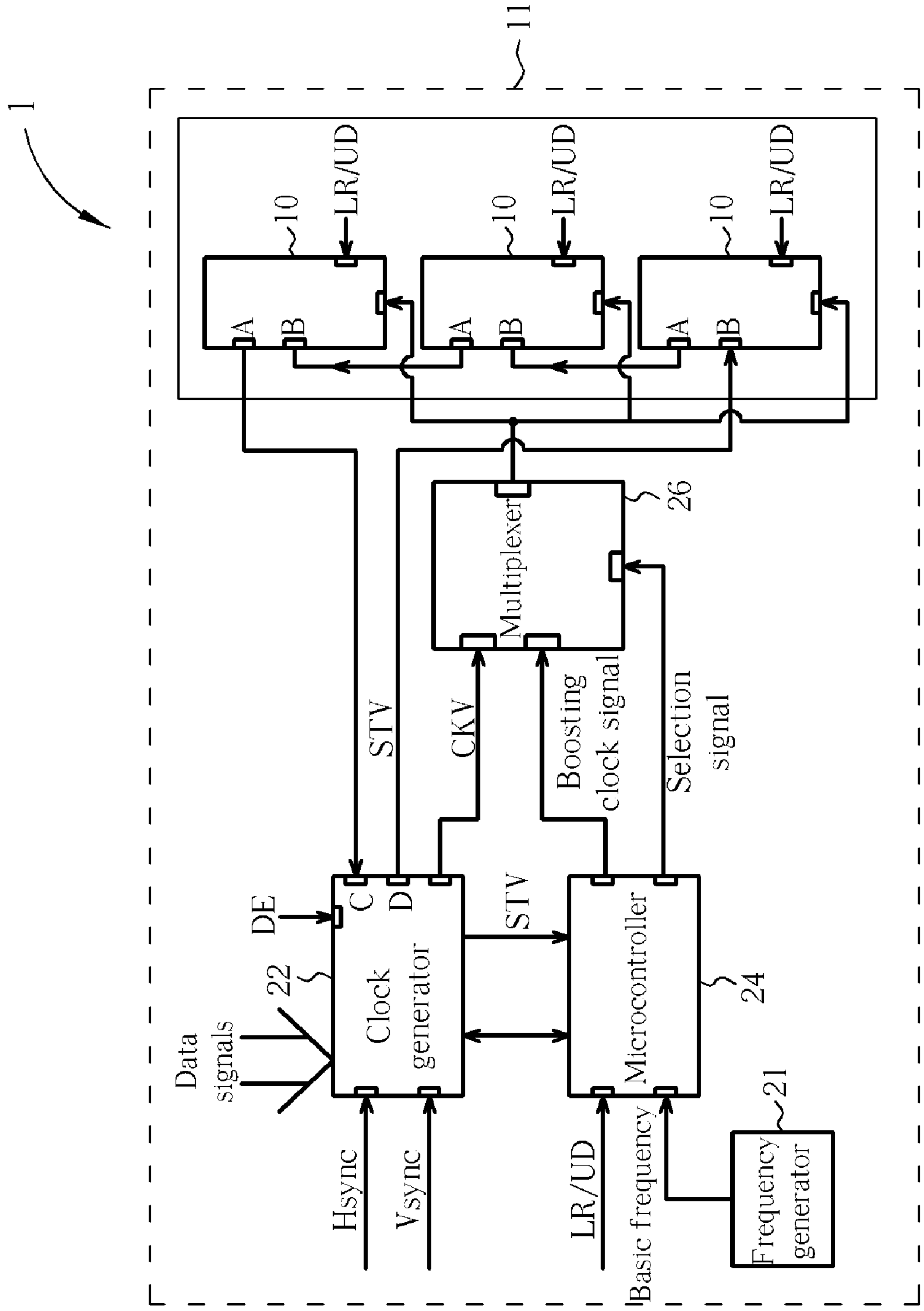
FIG. 2 is a block diagram of the asymmetric display panel shown in FIG. 1 in an image non-inversion state.

Please refer to FIG. 2, which is a block diagram of the asymmetric display panel 1. The asymmetric display panel 1 comprises a clock generator 22, a microcontroller 24, a multiplexer 26, a frequency generator 21, and a plurality of gate driver integrated circuits 10. The clock generator 22, the microcontroller 24, the multiplexer 26, and the frequency generator 21 can be positioned on the substrate 11.

The clock generator 22 receives a horizontal synchronization signal Hsync, a vertical synchronization signal Vsync, data signals, and a display time signal DE for indicating when to display valid image data. The clock generator 22 generates a vertical initial signal STV and a gate clock signal CKV in response to the received horizontal synchronization signal Hsync and the vertical synchronization signal Vsync. Each frame period of the asymmetric display panel 1 includes a blanking period and a display period. A number of pulses of the gate clock signal CKV is the same as the number of gate lines coupled to the display area 12.

The microcontroller 24 determines whether the asymmetric display panel 1 should switch to an image inversion mode in response to an image inversion request signal LR/UD. When the asymmetric display panel 1 switches to the image inversion mode, the microcontroller 24 generates a boosting clock signal to drive the gate lines disconnected from the display area 12 of the asymmetric display panel 1. Therefore, a pulse number of the boosting clock signal is the same as the number of disconnected gate lines. The microcontroller 24 receives the vertical initial signal STV from the clock generator 22 via an ICC interface to timely generate the boosting clock signal. The frequency generator 21 provides a base frequency signal to the microcontroller 24, and then the microcontroller 24 generates the boosting clock signal by dividing the base frequency signal.

Two input terminals of the multiplexer 26 respectively receive the gate clock signal CKV from the clock generator 22 and the boosting clock signal from the microcontroller 24. The multiplexer 26 outputs the gate clock signal CKV or the boosting clock signal in response to a selection signal received from the microcontroller 24.

Each of the gate driver integrated circuits 10 and the clock generator 22 respectively have two bi-directional I/O terminals, i.e., the two bi-directional I/O terminals of the gate driver integrated circuit 10 are A and B terminals, and the two bidirectional I/O terminals of the clock generator 22 are C and D terminals. The gate driver integrated circuits 10 switches the delivery direction of signals between the A terminal and the B terminal, i.e., from A to B or from B to A, in response to the image inversion request signal LR/UD. The microcontroller 24 notifies the clock generator 22 when to switch the delivery direction of signals between the C terminal and the D terminal, i.e., from C to D or from D to C, via the ICC interface in response to the image inversion request signal LR/UD.

Figure 3:
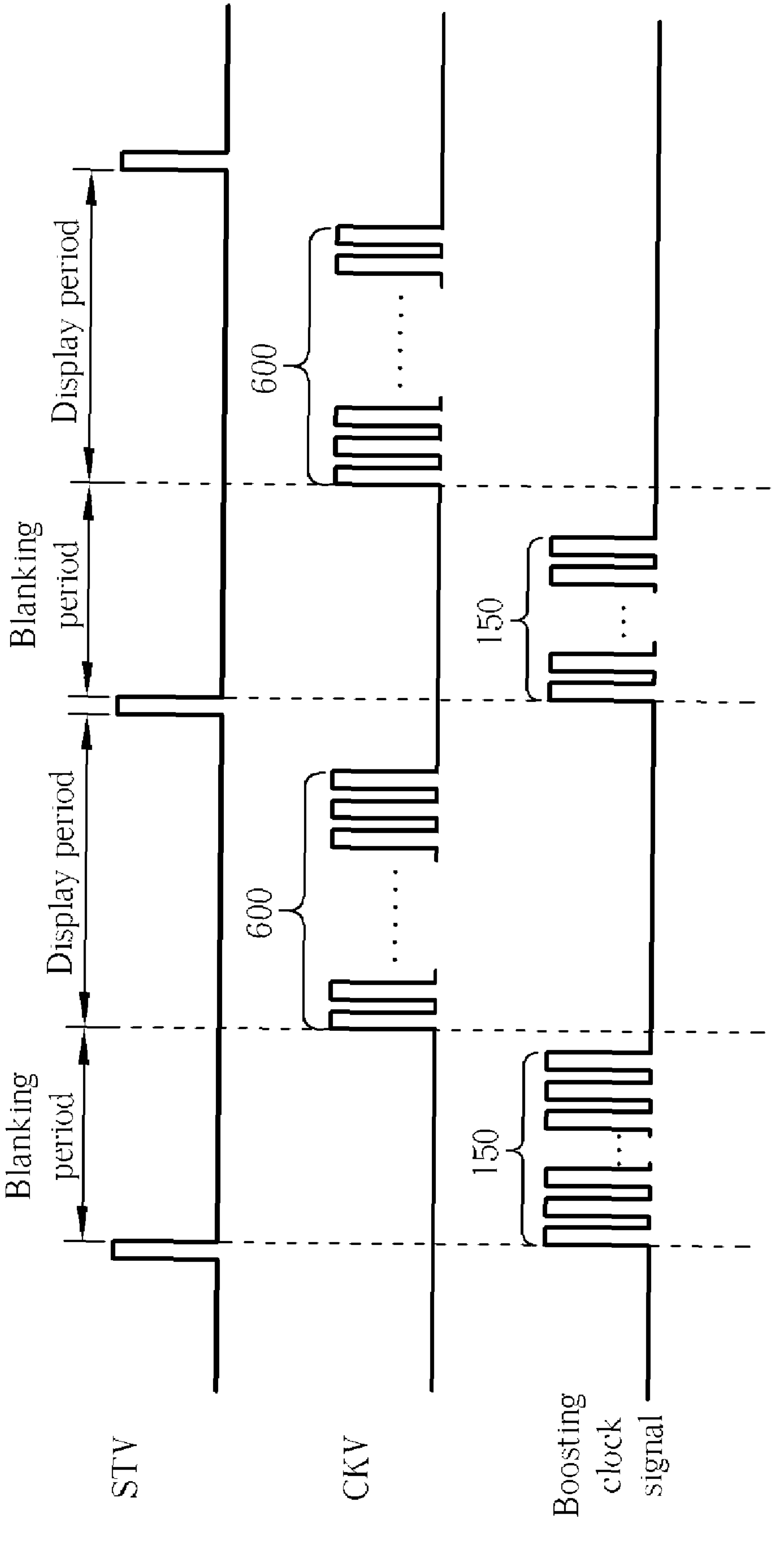
FIG. 3 is a timing diagram of signals of the asymmetric display panel shown in FIG. 1.

Please refer to FIG. 3, which is a timing diagram of signals of the asymmetric display panel 1. When the display panel 1 is in an image non-inversion state, the microcontroller 24 sends the selection signal to command the multiplexer 26 to output the gate clock signal CKV within display periods. The pulse number of the gate clock signal CKV within one display period is 600 and is equal to the number of the gate lines of the display area 12. Referring to FIG. 2, each of the gate driver integrated circuits 10 sets the terminal A as the output terminal and the terminal B as the input terminal in response to the image inversion request signal LR/UD. The microcontroller 24 commands the clock generator 22 via the ICC interface to set the terminal D as the output terminal and the terminal C as the input terminal. Therefore, the vertical initial signal STV outputted from the terminal D is transmitted to terminal B of the bottom gate driver integrated circuit 10, and the gate driver integrated circuits 10 is sequentially, i.e., from the bottom gate driver integrated circuit 10 to the top gate driver integrated circuit 10, driven by the vertical initial signal STV.

Figure 4:
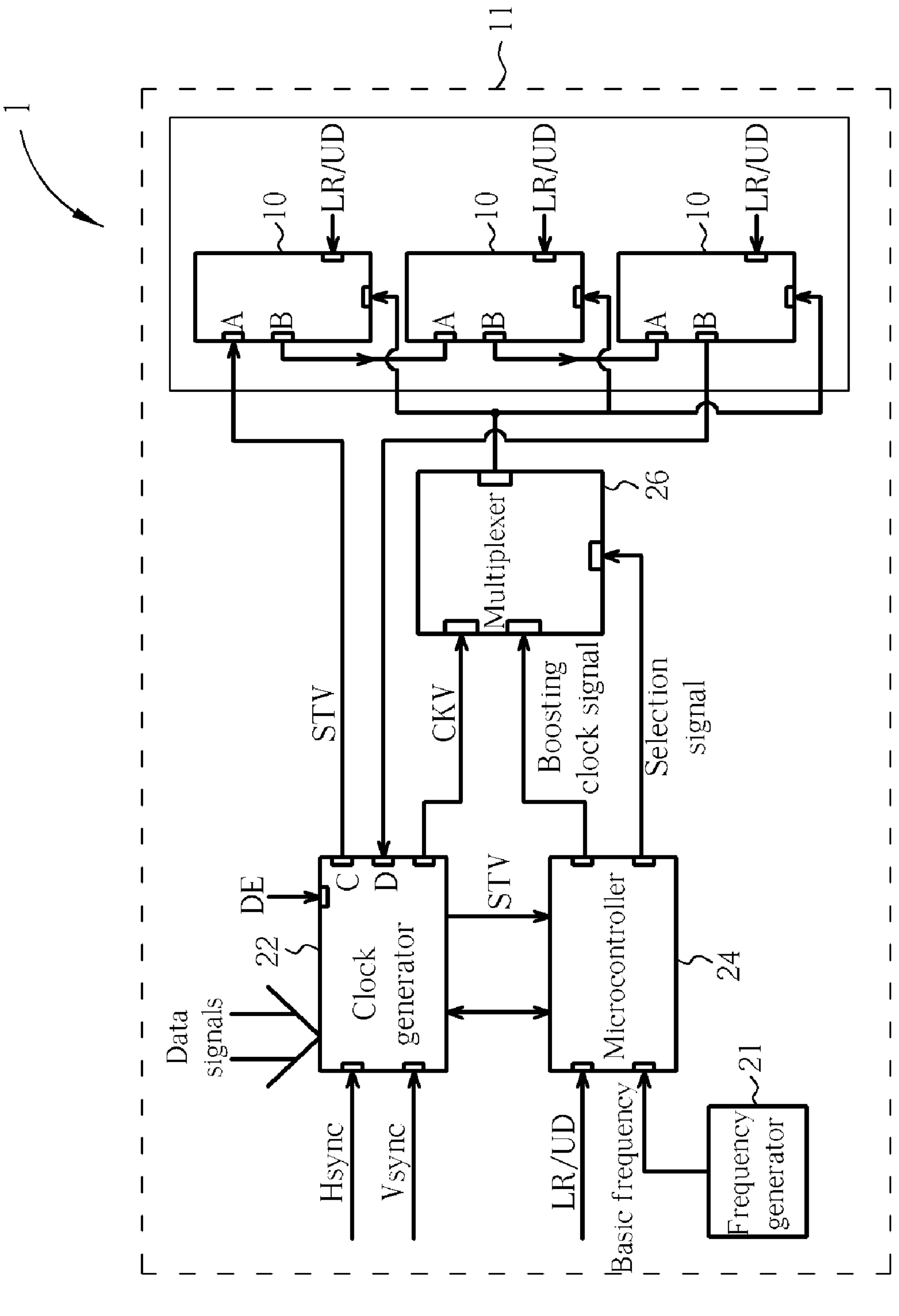
FIG. 4 is a block diagram of the asymmetric display panel shown in FIG. 1 in an image inversion state.

When the display panel 1 is in an image inversion state, the microcontroller 24 sends the selection signal to command the multiplexer 26 to output the boosting clock signal within blanking periods. The pulse number of the booting clock signal within one blanking period is 150 and is equal to the number of gate lines disconnected from the display area 12. Then, the microcontroller 24 sends the selection signal to command the multiplexer 26 to output the gate clock signal CKV within the display period. Referring to FIG. 4, each of the gate driver integrated circuits 10 sets the terminal A as the input terminal and the terminal B as the output terminal in response to the image inversion request signal LR/UD. The microcontroller 24 commands the clock generator 22 via the ICC interface to set the terminal C as the output terminal and the terminal D as the input terminal. Therefore, the vertical initial signal STV outputted from the terminal C is transmitted to terminal A of the top gate driver integrated circuit 10, and the gate driver integrated circuits 10 is sequentially, i.e., from the top gate driver integrated circuit 10 to the bottom gate driver integrated circuit 10, driven by the vertical initial signal STV to vertically invert images.

Figure 5:
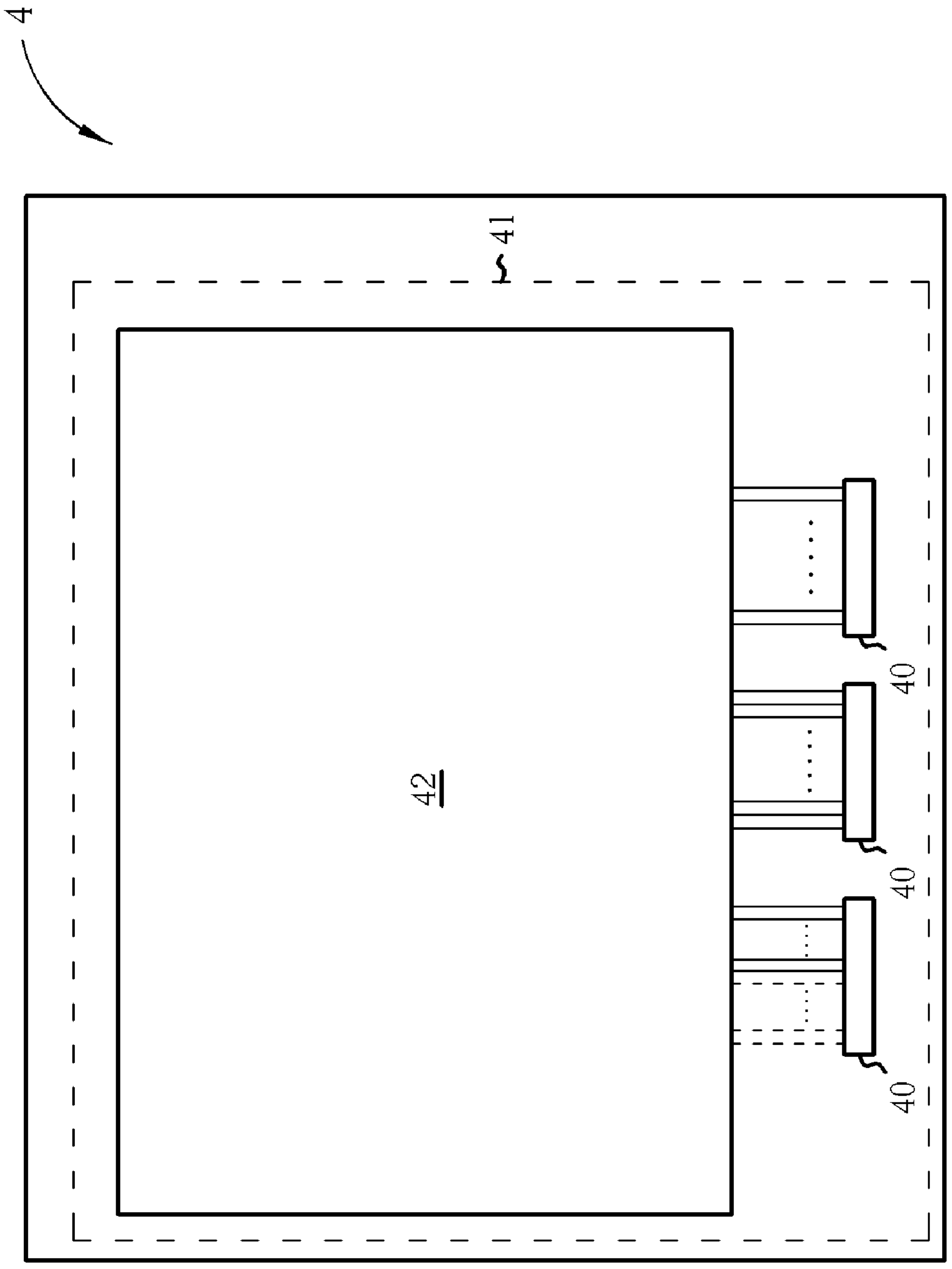
FIG. 5 is a schematic diagram of another asymmetric display panel according to the present invention.
Figure 6:
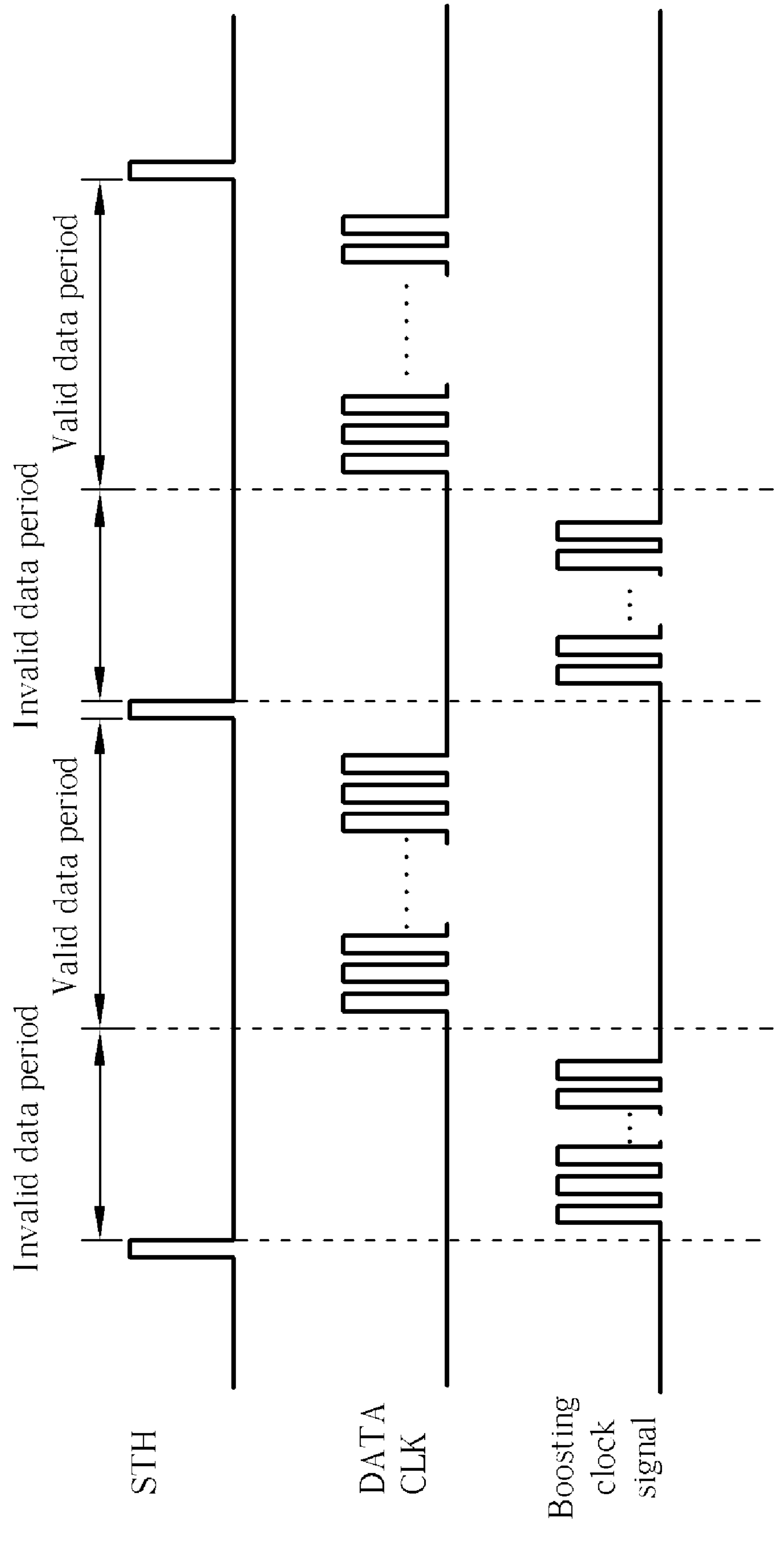
FIG. 6 is a timing diagram of signals of the asymmetric display panel shown in FIG. 5.
Figure 7:
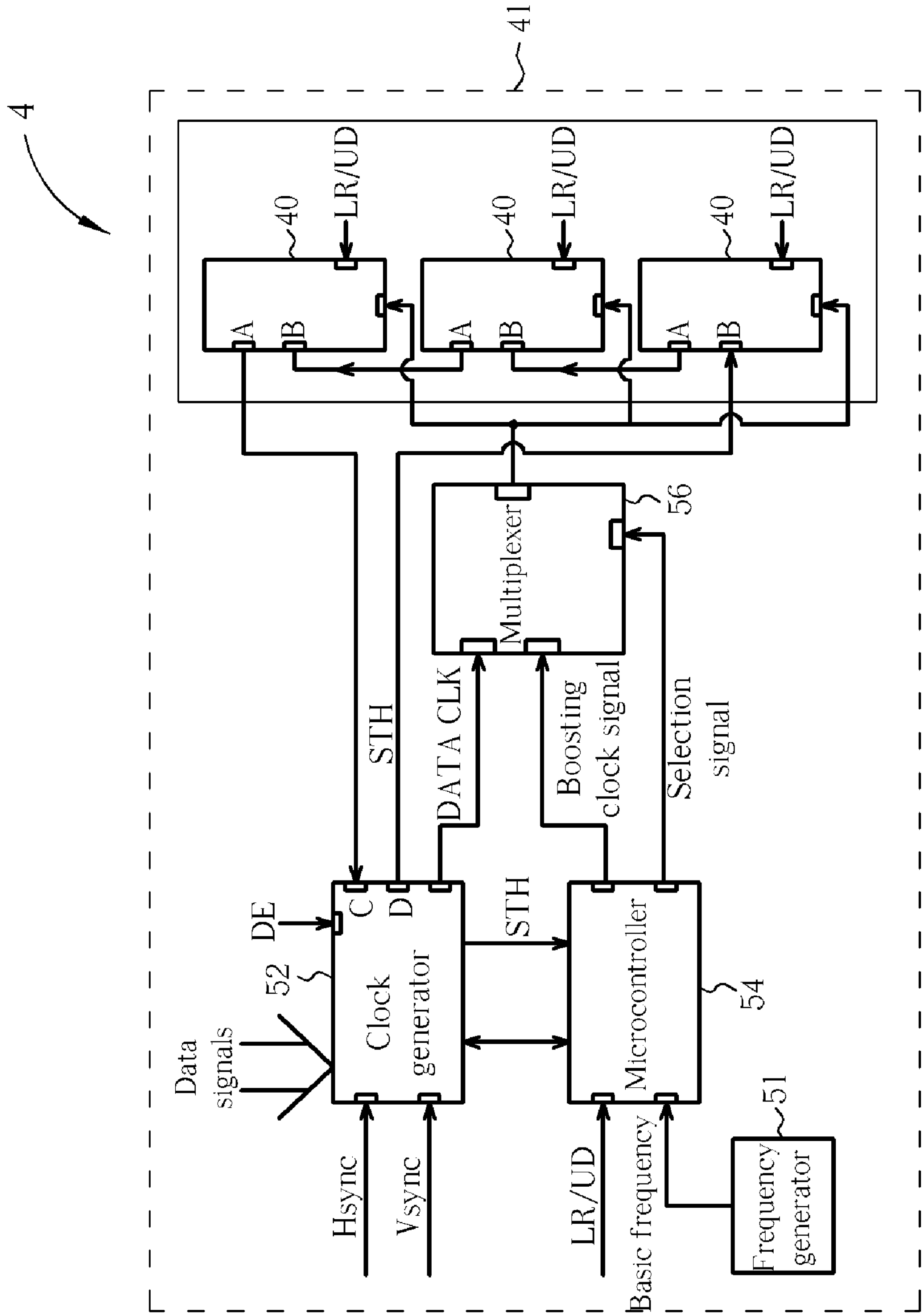
FIG. 7 is a block diagram of the asymmetric display panel shown in FIG. 5 in the image non-inversion state.
Figure 8:
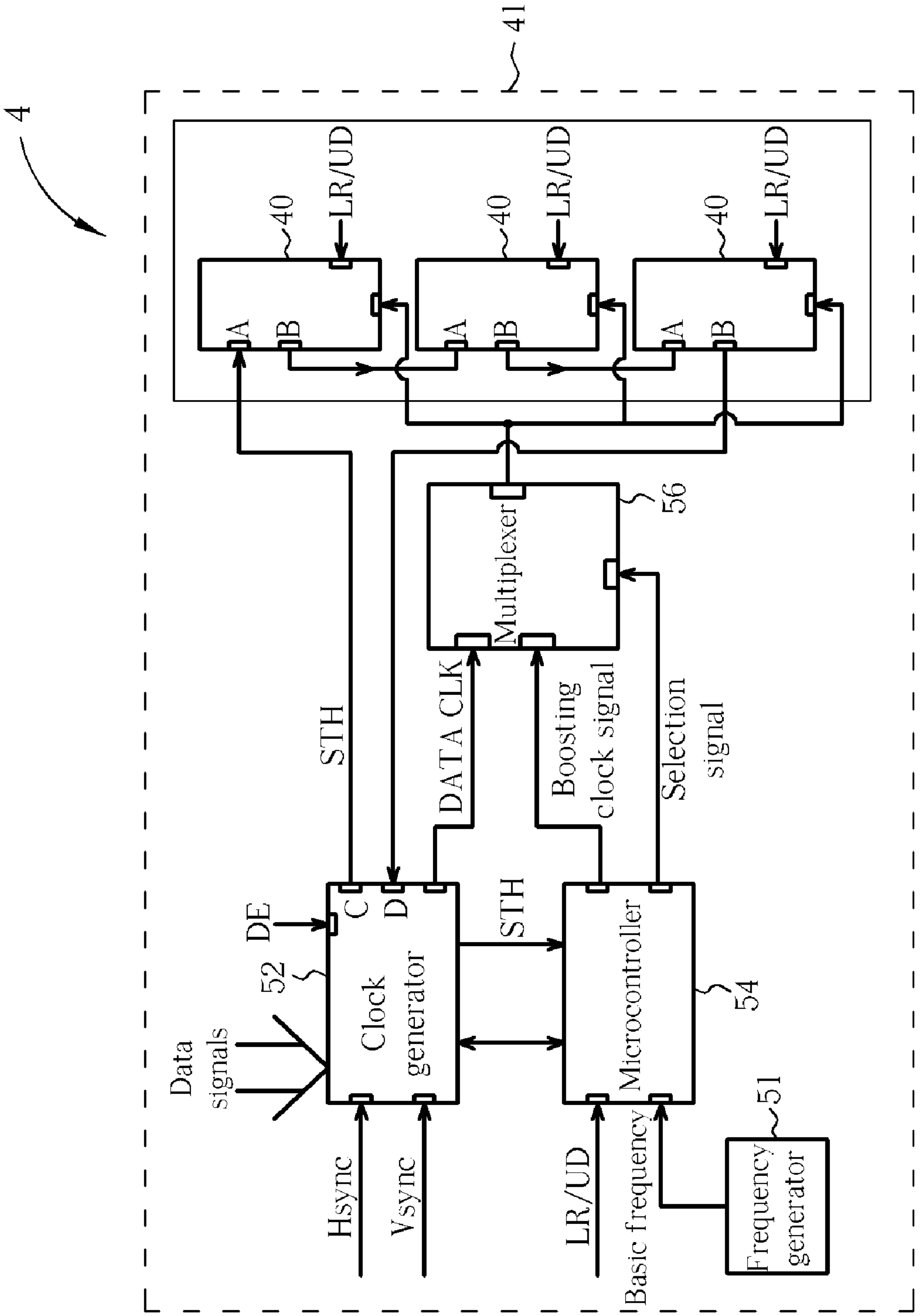
FIG. 8 is a block diagram of the asymmetric display panel shown in FIG. 5 in the image inversion state.

Please refer to FIGS. 5-8. FIG. 5 is a schematic diagram of another asymmetric display panel 4 according to the present invention. FIG. 6 is a timing diagram of signals of the asymmetric display panel 4. FIG. 7 and FIG. 8 are block diagrams of the asymmetric display panel 4 for respectively indicating delivery paths of signals in the image non-inversion state and in the image inversion state. The asymmetric display panel 4 comprises a plurality of data driver integrated circuits 40 and a display area 42. The data driver integrated circuits 40 and the display area 42 are positioned on a substrate 41, and some data lines coupled to one of the data driver integrated circuits 40 are disconnected from the display area 42.

The asymmetric display panel 4 further comprises a clock generator 52, a microcontroller 54, a multiplexer 56, and a frequency generator 51. The clock generator 52, the microcontroller 54, the frequency generator 51, and multiplexer 56 can be positioned on the substrate 41. The operations of the above elements of the asymmetric display panel 4 are similar to those shown in FIG. 2. Therefore, further description of these elements is omitted.

The clock generator 52 generates a horizontal initial signal STH and a data clock signal DATA CLK. The pulse number of the data clock signal DATA CLK is equal to the number of data lines coupled to the display area 42 of the display panel 4. Two input terminals of the multiplexer 56 respectively receive the data clock signal DATA CLK from the clock generator 52 and the boosting clock signal from the microcontroller 54, and the multiplexer 56 outputs the data clock signal DATA CLK or the boosting clock signal in response to a selection signal received from the microcontroller 54.

Each frame display period includes an invalid data period and a valid data period. When the asymmetric display panel 4 is in the image non-inversion state, the microcontroller 54 sends the selection signal to command the multiplexer 56 to output the data clock signal DATA CLK within the valid data period. The directions of signal delivery of the terminals A and B of the data driver integrated circuits 40 and the terminals C and D of the clock generator 52 are indicated in FIG. 7. The data driver integrated circuits 40 shown in FIG. 5 are driven from right to left by the horizontal initial signal STH.

When the asymmetric display panel 4 is in the image inversion state, the microcontroller 54 sends the selection signal to command the multiplexer 56 to output the boosting clock signal within the invalid data period and to output the data clock signal DATA CLK within the valid data period. The directions of signal delivery of the terminals A and B of the data driver integrated circuits 40 and the terminals C and D of the clock generator 52 are indicated in FIG. 8. The data driver integrated circuits 40 shown in FIG. 5 are driven from left to right by the horizontal initial signal STH to horizontally invert images.

The present invention discloses a method to drive scan lines or data lines disconnected from a display area of an asymmetric display panel by providing a boosting clock signal within a blanking period of a frame display period and to drive the scan lines or the data lines coupled to the display area of the asymmetric display panel by providing corresponding clock signals. With the help of a microcontroller and a multiplexer, image inversion on an asymmetric display panel can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image inversion method for use in a display panel, the method comprising:

providing a frame-inversion request signal;

providing a boosting clock signal in response to the frame-inversion request signal;

driving a plurality of n gate lines disconnected from a display area on the display panel in response to the boosting clock signal;

providing a gate clock signal; and driving a plurality of gate lines coupled to the display area in response to the gate clock signal;

wherein the boosting clock signal is provided during a blanking period of a frame display period, a number of pulses of the boosting clock signal during each blanking period being equal to n, and the gate clock signal is provided during a display period of the frame display period.

2. The method of claim 1, wherein the boosting clock signal is provided during the blanking period of the frame display period, and subsequently, the gate clock signal is provided during the display period of the frame display period.

3. The method of claim 1, wherein a pulse number of the boosting clock signal is less than that of the gate clock signal.

4. The method of claim 1, further comprising:

providing a data clock signal; and driving a plurality of data lines coupled to the display area in response to the data clock signal.

5. An asymmetric display panel comprising:

a substrate having a display area;

a plurality of gate lines formed on the substrate;

a plurality of data lines formed on the substrate;

a clock generator, positioned on the substrate, for generating a gate clock signal and a data clock signal;

a microcontroller, positioned on the substrate and coupled to the clock generator, for generating a boosting clock signal and a selection signal;

a multiplexer, positioned on the substrate, including:

a first input coupled to the clock generator;

a second input, coupled to the microcontroller, for receiving the boosting clock signal from the microcontroller;

an output; and a controlling input, coupled to the microcontroller, for receiving the selection signal from the microcontroller, such that the multiplexer outputs the boosting clock signal during an invalid data period and outputs the data clock signal during a valid data period in response to the selection signal;

at least one data line driving circuit electrically coupled to the data lines;

a first gate line driving circuit comprising:

a first output coupled to the gate lines disconnected from the display area;

a second output coupled to gate lines coupled to the display area; and an input, coupled to the output of the multiplexer, for receiving one of the gate clock signal and the boosting clock signal;

at least one second gate line driving circuit comprising:

a second output coupled to gate lines coupled to the display area; and an input, coupled to the output of the multiplexer, for receiving one of the gate clock signal and the boosting clock signal; and switching circuitry coupled to the first gate line driving circuit and to the at least one second gate line driving circuit for selectively causing the at least one second gate line driving circuit to be driven before the first gate line driving circuit during the valid data period and the first gate line driving circuit to be driven before the at least one second gate line driving circuit during the invalid data period.

6. The method of claim 1 wherein a number of pulses of the gate clock signal during each frame display period equals a number of gate lines in the plurality of gate lines coupled to the display area.

7. An asymmetric display panel comprising:

at least one first gate line driving circuit having a first output coupled to gate lines coupled to a display area of the display panel;

a second gate line driving circuit having a second output coupled to gate lines disconnected from the display area; and switching circuitry coupled for selectively causing the at least one first gate line driving circuit to be driven before the second gate line driving circuit during a valid data period and the second gate line driving circuit to be driven before the at least one first gate line driving circuit during an invalid data period.

* * * * *